UNITED STATES PATENT OFFICE.

LEONARD ROBERTS COATES, OF BALTIMORE, MARYLAND.

MANUFACTURE OF FERTILIZERS.

13,302. Specification of Reissued Letters Patent. Reissued Oct. 31, 1911.

No Drawing. Original No. 971,830, dated October 4, 1910, Serial No. 514,696. Application for reissue filed April 4, 1911. Serial No. 618,972.

*To all whom it may concern:*

Be it known that I, LEONARD ROBERTS COATES, of the city of Baltimore and State of Maryland, have invented certain Improvements in the Manufacture of Fertilizers, of which the following is a specification.

This invention relates to methods of producing fertilizers and products of the same; and it comprises a method wherein calcium phosphate is heated in the presence of lime at such temperatures and in such a manner as to produce a material wherein lime and calcium phosphate are intimately and molecularly united or associated in such a nature that said material readily slakes or hydrates and on slaking or hydration releases the phosphate in the state of a substantially impalpable powder, and wherein such material is slaked or hydrated to produce an intimate dry commixture of finely divided slaked lime and of finely divided freely available phosphate; and it also comprises as a new product for fertilizing purposes, a dry commixture of finely divided hydrated lime with finely divided phosphate of lime in a readily available condition; all as more fully hereinafter set forth and as claimed.

As I have discovered, calcium phosphate occurs in certain native phosphate rocks which are of such a nature that they may be called a conglomerate of phosphate and carbonate of lime, with a portion of the phosphate in such relation to the carbonate of lime present that it may be said to be chemically, or quasi-chemically, combined therewith, while the residual portion of the phosphate, which consists generally of phosphatic fossils, is merely mechanically mixed in the material. Material such as these phosphate rocks is relatively "unavailable" in the soil and is generally acidified to make it available. I have however discovered that by carefully heating such an intimate mixture of phosphate and carbonate of lime under regulated conditions the calcium carbonate is calcined to form lime and a product can be produced which upon a slaking treatment will break down to give a dry finely divided product containing the phosphate in the condition of a substantially impalpable powder which is readily available as a plant food. The burning operation must of course not be carried so far as to make a non-slaking composition. As to the state in which the combined or associated phosphate of lime and carbonate of lime exist together in the original mineral, I am unable to say, but it is perhaps in the form of a solid solution. At all events, when such a mixture as occurs in the rock is properly heated, the carbonate of lime is converted into oxid of calcium (lime) or calcined, and the whole mass is left in such a condition that upon slaking it not only is the oxid of lime so formed reduced to a finely divided state but also the phosphate which occurs therewith is similarly reduced. It may be that under the conditions solid solutions are also formed in the burning operation itself. At all events with proper control of burning conditions even with relatively coarse phosphate, very finely divided phosphate is formed in the slaking. In operation upon the particular character of rock mentioned, the phosphatic fossils which occur therein are brought to a friable condition without material change in shape and size; this particular part of the phosphatic material therefore not behaving like the other phosphatic material of the rock which is more intimately associated with carbonate. In the burnt and slaked rock, this portion of the phosphate does not break down into finely divided form. Rock of this character not being homogeneous in texture does not give a uniform product, and therefore in an extension of the present invention, after having brought the phosphate into a condition in which it is available as a fertilizing material in the manner stated, I separate the burnt material mechanically into different fractions and admix these fractions in such manner as to produce a fertilizer having predetermined amounts of phosphoric acid and of lime contained therein.

In carrying out my invention in practice I heat or "burn" the rock in such a manner and at such temperatures that the carbonate of calcium will be converted into lime and the described results upon the associated phosphate are obtained, the heating being sufficient to calcine the carbonate and affect the phosphate as stated without making a non-slaking or fused mass. The phosphatic fossils in this treatment are reduced to a friable condition but without material change in shape and size. I then slake the burned material by exposure to the air or otherwise, to obtain a dry fine or hydrated mass whereby the original mass is broken up and disintegrated, most of it becoming a very fine powder. Where air slaking is resorted to, some of the lime may be, and usually is, recarbonated. On slaking, the lime and the associated portion of the phosphate before mentioned are converted into a substantially impalpable powder while the friable phosphate fossils occurring in the rock are broken down somewhat. The slaked product is now a mechanical mixture of slaked or hydrated lime, phosphate of lime in the stated finely divided condition and phosphate of lime coming from the fossils in coarse friable particles. The original rock not being homogeneous or uniform these substances are not uniformly mixed and the slaked product is not as yet suitable for general application to soils. I therefore advantageously pass the slaked material through a sieve or screen of a suitable mesh. The coarser particles which are screened out consist mainly of phosphate of lime from the stated fossils. These coarser particles are ground and added to the portion which is passed through the sieve, after which the whole is thoroughly mixed. The product so obtained will then consist of a mixture uniform, mechanically, throughout of hydrated or slaked lime with phosphate of lime. As stated, the proportions of the elements of this material are not constant in the original rock, varying considerably. The product obtained by the grinding and sifting operations therefore, while averaged in composition and uniform in texture does not have definite percentages of fertilizing bodies present. It will vary with the rock used. In practice therefore I usually extend the invention by mixing adjusted proportions of reground coarser material with the finer material recovered from the first sifting of the reground coarser material. After burning the original rock in such a manner that it will slake and then slaking it to a dry powder, I screen it or sift it as described. The coarser part remaining on the screen and the fine powder are each analyzed, and the value of each ascertained. The reground coarse material and the fine material going through the screens are then reunited in adjusted proportions so as to produce fertilizers of uniform fine textured character and having predetermined values based upon the percentages of lime and of phosphoric acid contained therein.

While I am unable to state the chemical nature of the recovered very fine calcium phosphate produced in the described manner, viz., by burning an intimate mixture of calcium phosphate (tricalcium phosphate or rock phosphate) and lime in such a manner as to obtain a material which will slake and disintegrate to give a dry product containing the phosphate in impalpable form, I am of the opinion that it is still tricalcium phosphate but in a state of extreme fineness. At all events, it appears to be as valuable for plant food as phosphate rock having the phosphoric acid thereof rendered available by means of sulfuric acid in the usual way.

Since the object of the first step in the present process is to produce a heated composition which will readily slake, there must always be a comparatively large amount of lime present; enough to cause the mass to disintegrate on slaking and the heating must be so conducted as to avoid the production of non-slaking bodies. Overburnt lime does not slake readily and with limited proportions of lime and high heat, the normal phosphate is converted into other and non-slaking bodies.

What I claim is:—

1. The process of producing from a mineral consisting of a conglomerate of carbonate of lime and phosphate of lime chemically combined, and the same mechanically mixed with carbonate of lime, and phosphatic fossils, two separate bodies adapted for fertilizing purposes, but differing in agricultural and commercial values, one body consisting of hydrate of lime mechanically mixed with a phosphate of lime, both salts being in the condition of a practically impalpable powder, and the other body, of phosphate of lime in fossil form and in a friable condition, which consists in burning and slaking the said material, and then separating the same into two bodies by screening out the said friable fossils of phosphate of lime, substantially as specified.

2. The process of treating a mineral composed of carbonate of lime and phosphate of lime which are in chemical combination, and the same mechanically mixed with phosphate of lime, whereby the two salts are dissociated and the latter reduced to practically an impalpable powder, and the whole brought to a body having the same constituent parts distributed throughout in uniform proportions, which consists in burning, and slaking the mineral, then screening out the coarser particles or phosphate of lime and grinding them, and then returning the ground to the unground constituent and mixing the two bodies together, substantially as, and for the purpose specified.

3. The process of treating a mineral composed of carbonate of lime and phosphate of lime which are in chemical combination and the same mechanically mixed with phosphate of lime, whereby the two salts are dissociated and the latter reduced to a practically impalpable powder, and a body thereby produced having the said constituent parts mechanically combined in predetermined proportions, which consists in burning and slaking the mineral, then screening out the coarser particles of phosphate of lime, and then mixing the ground and unground salts together in predetermined proportions whereby a fertilizer is produced having a commercial value based on the proportions of phosphoric acid and lime, contained therein, substantially as, and for the purpose specified.

4. The process of producing fertilizers from native mineral materials containing phosphate of lime and carbonate of lime in combined form with said carbonate present in proportions sufficient to allow production of readily slaking calcines, which comprises heating such material at a calcining temperature in such manner as to form a readily slaking material without substantial chemical action on the phosphate and thereafter slaking the calcined material to produce a mixture of dry finely divided lime and of released phosphate in impalpably fine available form.

5. In the manufacture of fertilizers, the process which comprises heating material comprising intimately commingled carbonate of lime and phosphate of lime, said carbonate being present in amount sufficient to allow said material upon calcination to form a readily slaking mass, at a calcining temperature in such manner as to produce a readily slaking mass without substantial chemical action of the lime on the phosphate and thereafter slaking the calcined mass to produce a mixture of dry finely divided lime and of phosphate in impalpably fine available form.

6. As a new fertilizer the product obtained by calcining and slaking an intimate commixture of phosphate of lime with substantial proportions of carbonate of lime, such calcination being so conducted as to obtain a readily slaking mass, and such product comprising a dry intimate commixture of slaked lime and impalpably fine available phosphate of lime.

LEONARD ROBERTS COATES.

Witnesses:

LOUIS C. KLERLEIN,

WM. T. HOWARD.